(12) United States Patent
Gross (10) Patent No.: US 12,105,586 B2
(45) Date of Patent: *Oct. 1, 2024

(54) SYSTEM AND METHODS FOR DIAGNOSING AND REPAIRING A SMART MOBILE DEVICE BY DISABLING COMPONENTS

(71) Applicant: Ignite Enterprise Software Solutions, Inc., Austin, TX (US)

(72) Inventor: Amit Gross, Kfar-Saba (IL)

(73) Assignee: Ignite Enterprise Software Solutions, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,534

(22) Filed: May 22, 2023

(65) Prior Publication Data

US 2023/0297468 A1 Sep. 21, 2023

Related U.S. Application Data

(63) Continuation of application No. 17/406,971, filed on Aug. 19, 2021, now Pat. No. 11,693,731, which is a continuation of application No. 16/842,576, filed on Apr. 7, 2020, now Pat. No. 11,126,499, which is a continuation of application No. 15/857,391, filed on Dec. 28, 2017, now Pat. No. 10,684,912.

(51) Int. Cl.
| | |
|---|---|
| *G06F 11/10* | (2006.01) |
| *G06F 11/07* | (2006.01) |
| *G06F 11/30* | (2006.01) |
| *G06F 11/34* | (2006.01) |
| *H04W 28/04* | (2009.01) |

(52) U.S. Cl.
CPC ...... *G06F 11/1048* (2013.01); *G06F 11/0775* (2013.01); *G06F 11/079* (2013.01); *G06F 11/3055* (2013.01); *G06F 11/3476* (2013.01); *H04W 28/04* (2013.01)

(58) Field of Classification Search
CPC ............ G06F 11/1048; G06F 11/0775; G06F 11/079; G06F 11/3055; G06F 11/3476
See application file for complete search history.

(56) References Cited

U.S. PATENT DOCUMENTS

| | | | |
|---|---|---|---|
| 2007/0006212 A1* | 1/2007 | Kawamoto | G06F 11/1482 717/169 |
| 2011/0153073 A1* | 6/2011 | Jang | G06F 11/1482 700/245 |
| 2012/0209653 A1* | 8/2012 | Andoji | G06Q 10/0639 705/7.26 |

OTHER PUBLICATIONS

Notice of Allowance mailed Feb. 22, 2023, filed in U.S. Appl. No. 17/406,971, pp. 1-3.
Terminal Disclaimer filed Nov. 4, 2022, filed in U.S. Appl. No. 17/406,971, pp. 1-3.

(Continued)

*Primary Examiner* — Jigar P Patel (57) ABSTRACT

The present invention relates to computerized ("smart") mobile electronic devices and more particularly, to a system and methods of diagnosing and repairing malfunctions in smart mobile electronic devices, including a diagnostic process that utilizes decisions based on Big Data that holds information of multiple devices and offers a "disable components" (i.e., turn-off components) solution in order to overcome the problem without flashing a firmware or doing a factory-reset.

11 Claims, 5 Drawing Sheets

(56) References Cited

OTHER PUBLICATIONS

Terminal Diclaimer approved Nov. 4, 2022, filed in U.S. Appl. No. 17/406,971, p. 1.
Response to Non-Final Office Action dated Nov. 4, 2022, filed in U.S. Appl. No. 17/406,971, pp. 1-6.
Non-Final Office Action dated Aug. 5, 2022, filed in U.S. Appl. No. 17/406,971, pp. 1-7.

* cited by examiner

SYSTEM AND METHODS FOR DIAGNOSING AND REPAIRING A SMART MOBILE DEVICE BY DISABLING COMPONENTS

FIELD OF THE INVENTION

The present invention relates to computerized ("smart") mobile electronic devices and more particularly, to a system and methods of diagnosing and repairing malfunctions in smart mobile electronic devices, including a diagnostic process that utilizes decisions based on Big Data that holds information of multiple devices and offers a "disable components" (i.e., turn-off components) solution in order to overcome the problem without flashing a firmware or doing a factory-reset.

BACKGROUND OF THE INVENTION

Diagnosing a mobile device is a process that is typically done in retail/carrier stores as well as in repair centers.

The diagnostic process flow includes multiple tests, wherein some tests are automatic and some require a user's intervention ("manual tests"). For example, if a user complains about high battery consumption, then the diagnostic process flow would extract data from the mobile device (e.g.: via a designated application), analyze the extracted data to indicate the top battery consumption applications and offers to uninstall some applications as a solution to the problem.

In some cases, the solution would be a factory-reset of the device that will cause the deletion of all non-system related applications ("user applications") and in some cases even user-data.

A harsher solution is performing a "flashing" that will install a new firmware on the device and wipeout all the user data.

In all of these cases, the user applications will probably have to be re-installed once again. This happens since the diagnostics tests indicated to the user to remove an application that he often uses (e.g.: Facebook) and therefore in the long term the user might want to use this application again.

Hence, such a repair is likely to be a temporary repair and it is very likely that the malfunction will reoccur. Furthermore, some mobile applications cannot be uninstalled, in particular, with no limitations, pre-installed OEM/Carrier application.

In many cases there is a service or a component of the operating system (OS) that causes the problem, but yet, that service cannot be uninstalled since it is part of the framework of the operating system.

There is therefore a need and it is desired that a repair process of repairing an existing problem of the smart mobile device (SMD), will be performed without removing unnecessary user data, by "Disabling a component" that has been identified as a malfunction component.

The term "component" can be, for example: a $3^{rd}$ party application, a pre-installed OEM/carrier application or a framework service.

The term "smart" device, as used herein, refers to a computerized device.

SUMMARY OF THE INVENTION

A principle intention of the present invention includes providing a solution that is capable of disabling (i.e., turning off) components based on a pre-existing knowledge, provided that these components will not cause the operating system of the device to be unstable, and thereby resolve an existed malfunctioning problem in the device without removing unnecessary user data.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), phablets, mobile telephone or cellular telephone).

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based on emulation of a computer.

An "application", includes executable software, and optionally, any graphical user interfaces (GUI), through which certain functionalities may be implemented.

According to the teachings of the present invention, there is provided a diagnosing-and-repairing process of diagnosing and repairing a malfunction component of the operating system (OS) of a faulty smart mobile device, which process is conducted after performing an off-line, pre-process analysis and computation of the max/avg. priority of each process of each component of the OS. The diagnosing-and-repairing process includes the following steps:

a) sending at least one operational command to the OS of the faulty smart mobile device by a command-sending module that is operatively connected to the OS of the faulty smart mobile device, wherein the sent at least one command prompts processing activity in the faulty smart mobile device, including OS related activity;

b) recording logs of the processing activity in the faulty smart mobile device;

c) extracting data related to the faulty smart mobile device from a MDS-big-data server, the extracted data containing historical activity information and manufacturer's data related to the faulty smart mobile device;

d) analyzing the recorded data and the extracted data to thereby detect a malfunction OS component and/or a related malfunction component that is related to the detected malfunction OS component;

e) using the data extracted from the MDS-big-data server, determining if the detected malfunction OS component and/or the related malfunction component may be disabled, based on the pre-computed max/avg. priority of processes related to the detected malfunction OS component and/or a related malfunction component; and f) upon determining that the detected malfunction OS component and/or the related malfunction components may be disabled, disabling the detected malfunction OS component and/or the related malfunction components.

In some embodiments of the present invention, the command-sending module is an external-command-sending unit.

In some embodiments of the present invention, the command-sending module is an analyzing application, operable on the faulty smart mobile device.

Optionally, the detecting of a malfunction OS component and/or a related malfunction component that is performed by an analyzer server.

Optionally, the diagnosing-and-repairing process further includes an off-line step of analyzing the importance of each process of each component of the OS of the smart mobile device. Optionally, the off-line step of analyzing the importance of each process of each component of the OS of the smart mobile device is performed by an analyzer server.

According to the teachings of the present invention, there is provided a mobile-diagnostic-and-repair system for diagnosing and repairing a malfunction component of the operating system of a faulty smart mobile device. The mobile-diagnostic-and-repair system includes a command-sending module, an analyzer server, and a MDS-big-data server.

The command-sending module is configured to send at least one operational command to the OS of the faulty smart mobile device, wherein the sent at least one command prompts processing activity in the faulty smart mobile device, including OS related activity.

The command-sending module is further configured to records logs of the processing activity in the faulty smart mobile device and send the logs to the analyzer server.

The analyzer server is configured to extract data related to the faulty smart mobile device from a MDS-big-data server, the extracted data containing historical activity information and manufacturer's data related to the faulty smart mobile device.

The analyzer server is further configured to analyze the recorded data and the extracted data to thereby detect a malfunction OS component and/or a related malfunction component that is related to the detected malfunction OS component.

The analyzer server is further configured to determine if the detected malfunction OS component and/or the related malfunction component may be disabled, based on a pre-computed max/avg. priority of processes related to the detected malfunction OS component and/or a related malfunction component, and using said data extracted from said MDS-big-data server. Upon determining that the detected malfunction OS component and/or the related malfunction components may be disabled, the detected malfunction OS component and/or the related malfunction components is/are disabled.

The MDS-big-data server includes a big-data-storage-unit and optionally a big-data-managing module.

Optionally, the big-data-storage-unit includes a max/avg. priority sub-database and a history of OS processes sub-database.

Optionally, the analyzer server is adapted to access the big-data-storage-unit via the big-data-managing module.

Preferably, the max/avg. priority sub-database is built and updated off-line by an importance analysis of each process of each component of the OS of the smart mobile device. Optionally, the importance analysis is performed by the analyzer server.

Optionally, the analyzer server and the MDS-big-data server are embodied as a single server.

BRIEF DESCRIPTION OF THE DRAWINGS

The present invention will become fully understood from the detailed description given herein below and the accompanying drawings, which are given by way of illustration and example only, and thus not limiting in any way, wherein.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the invention. The various appearances of "one embodiment," "an embodiment" or "some embodiments" do not necessarily all refer to the same embodiment. Although various features of the invention may be described in the context of a single embodiment, the features may also be provided separately or in any suitable combination. Conversely, though the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. It is understood that the phraseology and terminology employed herein are not to be construed as limiting and are for descriptive purposes only.

Meanings of technical and scientific terms used herein are to be commonly understood as to which the invention belongs, unless otherwise defined. The present invention can be implemented in the testing or practice with methods and materials equivalent or similar to those described herein.

It should be noted that orientation related descriptions such as "bottom", "up", "upper", "down", "lower", "top" and the like, assumes that the associated item is operationally situated.

A principle intention of the present invention includes providing a solution to an existed malfunctioning problem in a computerized mobile electronic device, without removing unnecessary user data. The provided solution includes disabling components based on a pre-existing knowledge, typically in the form of Big Data from which that knowledge is extracted, provided that the disabled components will not cause the operating system of the device to become unstable.

The repair process of "Disabling a component" includes extracting specific logs from the faulty smart mobile device (SMD), and identifying the problematic/malfunction components and whether these malfunction components can be disabled, since not every component can be disabled and some components need to perform "uninstall updates" prior to the disabling. By using Big Data, the repair process figures out if the problematic components can be disabled without affecting the stability of the operating system of the SMD. Typically, a check if the candidate component for disablement was actually used by the user is performed, since it is not desired to disable an important system application/service that is used by the user.

The next phase in the repair process is disabling these components (automatically in most cases), while some components require another phase of uninstalling updates.

Figure 1A:
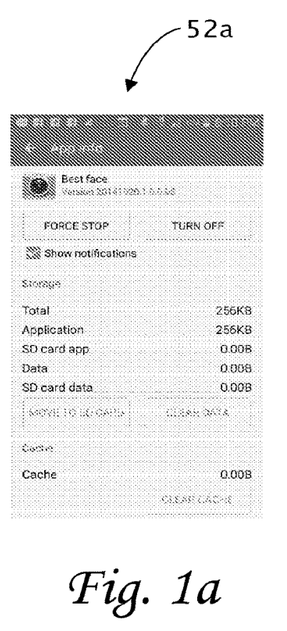
FIG. 1a depicts an example display 52a serving the example Application "Best face" that allows to either FORCE STOP the application or to TURN OFF the application.
Figure 1B:
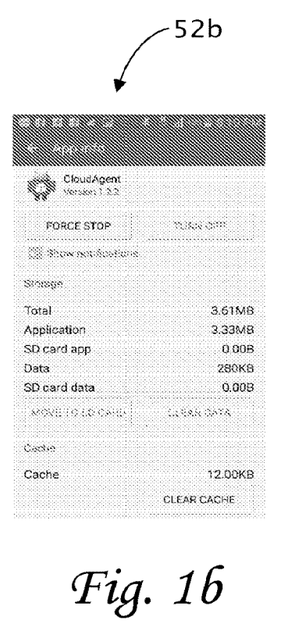
FIG. 1b depicts an example display 52b serving the example service "CloudAgent" that allows to either FORCE STOP the application or to CLEAR the CACHE from the application.
Figure 1C:
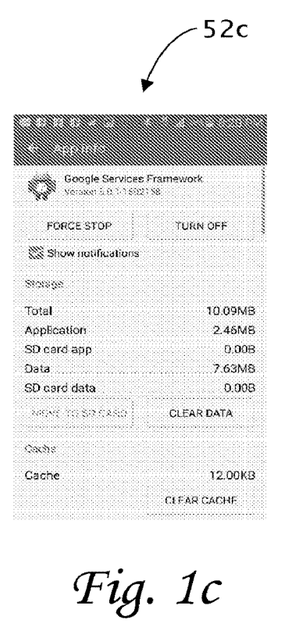
FIG. 1c depicts an example display 52c serving the example service "Google Services Framework" that allows to either FORCE STOP the application, or to TURN OFF the service or to CLEAR the CACHE from the application.
Figure 1D:
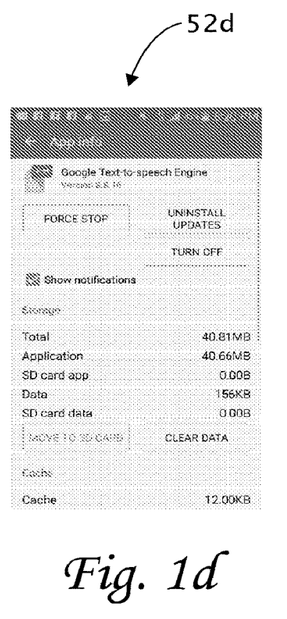
FIG. 1d depicts an example display 52d serving the example component "Google Text-to-speech Engine" that allows to either FORCE STOP the component, or to UNINSTALL UPDATES for the component, or to TURN OFF the component or to CLEAR the DATA.
Figure 1E:
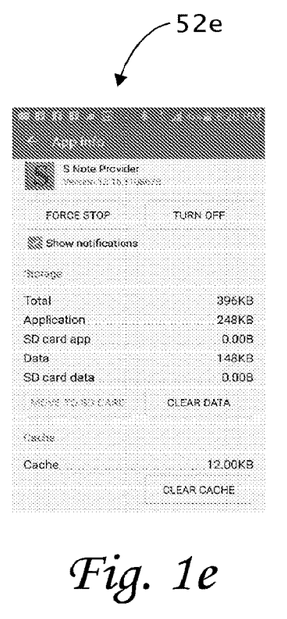
FIG. 1e depicts an example display 52e serving the example component "S Note Provider" that allows to either FORCE STOP the component, or to TURN OFF the component or to CLEAR the CACHE.
Figure 1F:
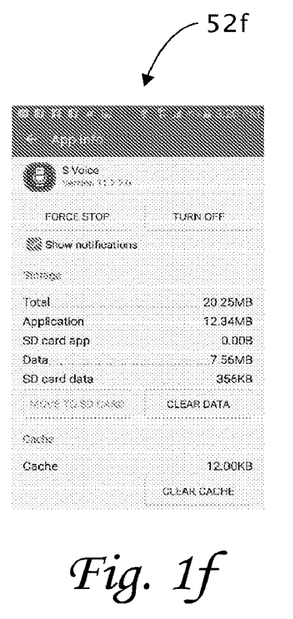
FIG. 1f depicts an example display 52f serving the example component "S Voice" that allows to either FORCE STOP the component, or to TURN OFF the component or to CLEAR the CACHE.

Reference is made to the drawings. None-limiting examples for services or components that are part of the operating system (OS), running on a processor 54 of a mobile device 50, and that can be disabled, but not uninstalled, are shown, by way of example, in FIGS. 1a-1f: FIG. 1a depicts an example display 52a serving the example Application "Best face" that allows to either FORCE STOP the application or to TURN OFF the application; FIG. 1b depicts an example display 52b serving the example service "CloudAgent" that allows to either FORCE STOP the application or to CLEAR the CACHE from the application; FIG. 1c depicts an example display 52c serving the example service "Google Services Framework" that allows to either FORCE STOP the application, or to TURN OFF the service or to CLEAR the CACHE from the application; FIG. 1d depicts an example display 52d serving the example component "Google Text-to-speech Engine" that allows to either FORCE STOP the component, or to UNINSTALL UPDATES for the component, or to TURN OFF the component or to CLEAR the DATA; FIG. 1e depicts an example display 52e serving the example component "S Note Provider" that allows to either FORCE STOP the component, or to TURN OFF the component or to CLEAR the CACHE; and FIG. 1f depicts an example display 52f serving the example component "S Voice" that allows to either FORCE STOP the component, or to TURN OFF the component or to CLEAR the CACHE.

Figure 2:
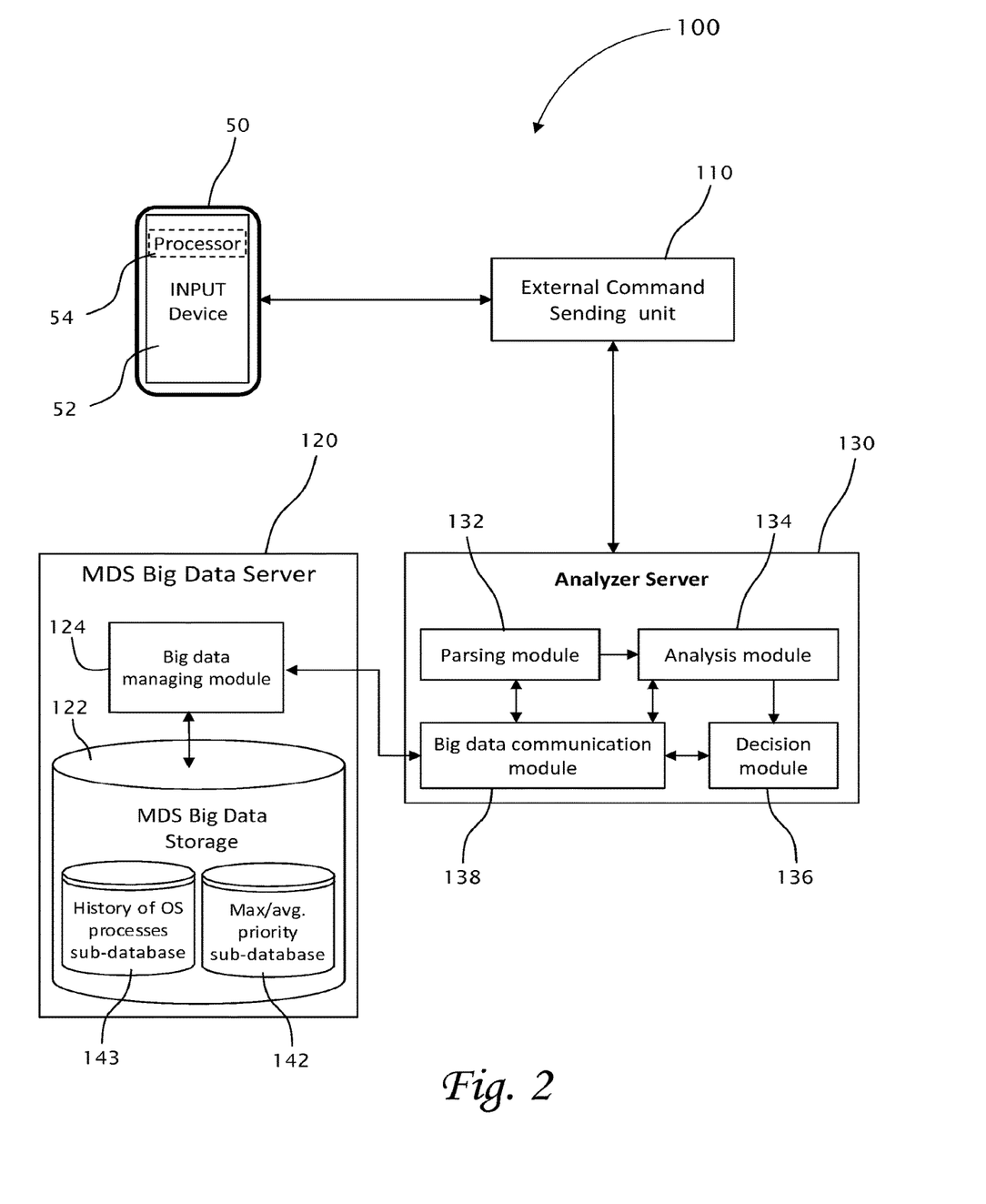
FIG. 2 is a schematic illustration of an example mobile-diagnostic-and-repair system, according to some embodiments of the present invention.

FIG. 2 is a schematic illustration of an example mobile-diagnostic-and-repair system 100, according to the embodiments of the present invention. In the example shown in FIG. 2, mobile-diagnostic-and-repair system 100 includes an external-command-sending unit 110, an analyzer server 130 and a selected MDS-big-data server 120 having a big-data-storage-unit 122 and optionally a big-data-managing module 124.

Analyzer server 130 may include a parsing module 132, an analysis module 134, a decision module 136, and a big-data-communication-module 138, wherein analyzer server 130 is in communication flow with MDS-big-data server 120, and wherein analyzer server 130 is adapted to access the big-data-storage-unit 122, typically, via big-data-managing module 124.

External-command-sending unit 110 is configured to interface with an input smart mobile device 50, having a processor 54 and a display 52, wherein input mobile device 50 is being diagnosed by mobile-diagnostic-and-repair system 100. Typically, external-command-sending unit 110 is configured to interface with input mobile device 50, with no limitations, via a connector such as a USB connector. External-command-sending unit 110 may also interface with input mobile device 50, with no limitations, via wireless communication means such as Bluetooth.

Analyzer server 130 may be embodied as a local server or a remote server, including a cloud server.

Figure 3:
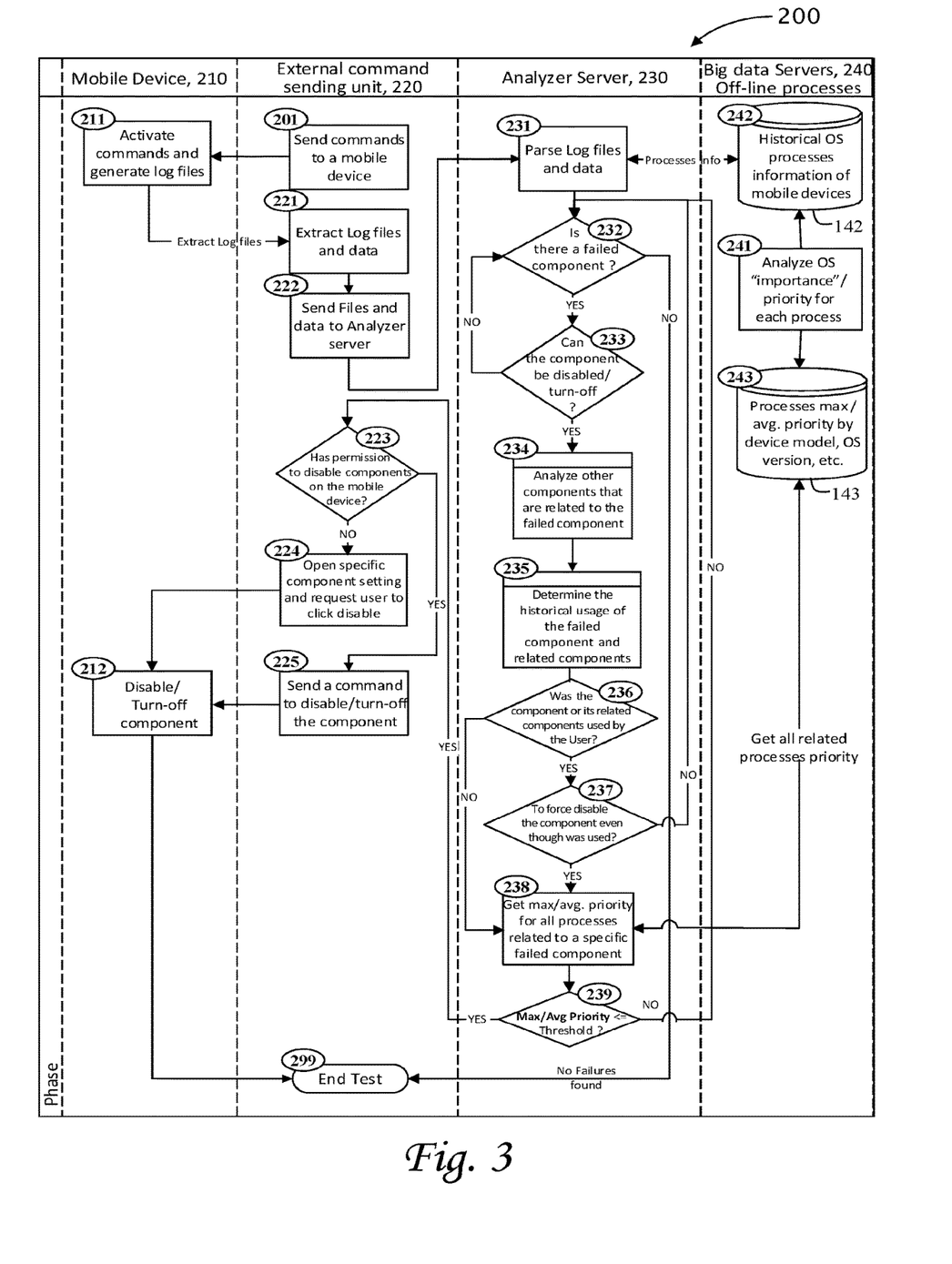
FIG. 3 is a schematic flow chart of an exemplary diagnosing-and-repairing process of diagnosing and repairing a malfunction mobile device, according to some embodiments of the present invention.

Reference is now also made to FIG. 3, showing a schematic flow chart of an exemplary diagnosing-and-repairing process 200 of diagnosing and repairing a malfunction mobile device 50, according to embodiments of the present invention. It is made clear that the provided embodiments may include only parts of this scheme. Schematic flow chart shown in FIG. 3 is schematically subdivided into vertical sections, that show processes and events for each type of components of mobile-diagnostic-and-repair system 100, including a "Mobile device" section 210, an "External command sending unit" section 220, an "Analyzer server" section 230 and a "Big Data servers" section 240.

Referring to the off-line process of "Big Data servers" section 240, analysis module 134 of analyzer server 130 performs an importance/priority analysis (denoted as step 241 of diagnosing-and-repairing process 200) of each process of each component of the OS of the mobile devices of respective 3$^{rd}$ party providers. Some results of the importance/priority analysis are stored (denoted as step 243 of diagnosing-and-repairing process 200) in a sub-database 143, which resulting data includes the computed max/avg. priority for all OS processes, organize, for example and with limitations, by priority by device model, OS version, etc. Further results of the importance/priority analysis are stored (denoted as step 242 of diagnosing-and-repairing process 200) in a sub-database 142, which resulting data includes the logs of historical OS processes information of mobile devices of the respective 3$^{rd}$ party providers.

Diagnosing-and-repairing process 200 starts the diagnosing and repairing in step 201, at section 220, by external-command-sending unit 110 sending operational commands to malfunction mobile device 50, operatively connected thereto. Process 200 proceeds as follows:

Step 211: process at section 210. Activating commands and generating log files.

External-command-sending unit 110 runs commands and/or applications on malfunction mobile device 50 to thereby prompting processing activity, including OS related activity. External-command-sending unit 110 then logs/records activities of the malfunction mobile device 50, and thereby generating log files, tracings and recordings resulted from the activities of the activated functions/applications.

Step 221: process at section 220. Extracting log files and data.

External-command-sending unit 110 extracts the logged/recorded activities of the activated functions/applications of malfunction mobile device 50, using for example, a historical sub-database 142.

Step 222: process at section 220. Sending files and data to mobile-analyzer server.

External-command-sending unit 110 sends the extracted log files and data to analyzer server 130, the "data" being, for example, information about malfunction mobile device 50 and the extracted recordings resulted from the activities of the activated functions/applications.

Step 231: processes in section 230. Parsing the extracted log files and data.

Parsing module 132 of analyzer server 130 parses the extracted log files and data to thereby detect a failed component or service (hereinafter referred to as a "failed component").

Step 232: processes in section 230. Was a failed component detected?

Analyzer server 130 attends to the next component and determines if it is a failing component.

If the currently attended component is in order and is the last component to be analyzed, go to step 299 (exit diagnosing-and-repairing process 200).

If the currently attended component is in order and is not the last component to be analyzed, repeat step 232.

Step 233: processes in section 230. Can the component be disabled?

It has been determined that the currently attended component is a failing component.

To determine if the failed component can be disabled/turned off, decision module 136 of analyzer server 130 communicates, via big-data-communication-module 138, with big-data-storage-unit 122, in which unit 122 the related 3$^{rd}$ party indicates if and in which conditions the failed component can be turned off.

Based on the decision made by decision module 136, analyzer server 130 determines if the failed component can be turned off. If the failed component cannot be turned off, go to step 232. That is, no repair option is available for this failed component.

Step 234: processes in section 230. Analyze other components that are related to the currently failed component.

It has been determined that the currently failed component can be turned off.

Analysis module 134 of analyzer server 130 analyzes other components that are related to the currently failed component to determine if any such related component is a failed component too.

Step 235: processes in section 230. Determine if the failed component or its related components used by the user of the malfunction mobile device?

Analyzer server 130 analyzes the usage history of the failed component or its related components, using historical sub-database 142, to thereby determine if the failed component or its related components was used by the user of the malfunction mobile device 50.

Step 236: processes in section 230. Was the failed component or its related components used by the user of the malfunction mobile device?

Analyzer server 130 determines if the failed component or its related components was used by the user of the malfunction mobile device 50, for example, by searching historical sub-database 142.

If the failed component or its related components was not used by the user of the malfunction mobile device 50, go to step 238.

Step 237: process of section 230. Check if to force disable the component even though it was used.

Analyzer server 130 determines if to force disable the component even though was used off the malfunction mobile device 50. It can be determined, for example, by how much the component was used. If the usage of using the component, or its related components, is below a specific threshold, then it can be disabled. It can also be determined if a relevant/related component was in the foreground below a predefined time interval.

If it is not allowed to force disable the failed component, even though the failed component was used off the malfunction mobile device 50, go to step 232.

Step 238: process of section 230. Get the maximum/average (max/avg.) priority for all processes related to the failed component.

Analyzer server 130 obtains the max/avg. priority for all processes related to the failed component, from max/avg. priority sub-database 143. The max/avg. priority for all processes related to the failed component quantifies the importance of a component. Decision module 136 compares the max/avg. priority to a preconfigured threshold, and thereby, decision module 136 can determine if the failing component can be neutralized without impairing the stability of the operating system.

Analyzer server 130 further analyzes other components that are related to the currently failed component to determine if any such additionally failed component has a high max/avg. priority that prevents that additionally failed component from being turned off.

Step 239: process of section 230. Check if the obtained ax/avg. priority for all processes related to the failed component surpasses a preconfigured threshold.

Decision module 136 of analyzer server 130 determines if the obtained max/avg. priority for all components related to the failed component surpasses the obtained preconfigured threshold.

If the obtained ax/avg. priority for all components related to the failed component surpasses the preconfigured threshold, go to step 232.

Else, the obtained ax/avg. priority for all components related to the failed component does not surpass the preconfigured threshold, and thereby go to step 223.

Step 223: processes in section 220. Check if permission to automatically disable components on the mobile device was granted.

It has been determined that the obtained ax/avg. priority for all components related to the failed component does not surpass the preconfigured threshold.

External-command-sending unit 110 determines if permission to automatically disable the failed component and/or related components was granted. If the failed component can be disabled automatically, go to step 225.

Step 224: processes in section 220. Prompting the user to disable the currently failed component, when the permission level is not enough to do it automatically.

It has been determined that the currently failed component cannot be turned off automatically. That is, no repair option is available for this failed component.

External-command-sending unit 110 prompts the user to manually disable the currently failed component, by opening the specific component's setting and requesting the user to click disable, if such option is available.

If the user has manually selected to disable the currently failed component, go to step 212

Step 225: processes in section 220. Determine if the failed component or its related components used by the user of the malfunction mobile device?

Analyzer server 130 sends a Disable/Turn-off command to the failed component and/or its related components that was/were used by the user of the malfunction mobile device 50.

Step 212: processes in section 210. The failed component or its related components is/are turned-off.

The failed component or its related components is/are turned-off.

Step 299: Exit.

[end of process 200]

Off-line processes related to diagnosing-and-repairing process 200, conducted in process of section 240:

Step 241: process of section 240. Offline analysis of an operating system (OS) and computing the "importance"/priority for each process of that OS.

Analysis module 134 of analyzer server 130 analyzes and computes the "importance"/priority for each process of each component of the OS.

Step 242: process of section 240. Update the historical information data of the processes of the OS of SMDs.

The history of information related to the OS of smart mobile devices of a $3^{rd}$ respective party manufacturer of each component of the is maintained in an off-line process.

Step 243: process of section 240. Update all processes max/avg. priority by device model, OS version, etc.

Analysis module 134 of analyzer server 130 further analyzes and computes the max/avg. priority of all processes of each component of the OS of SMDs of a respective $3^{rd}$ party manufacturer. The max/avg. priority facilitates determining if a component may be disabled, by comparing the max/avg. priority to an importance-threshold: if the max/avg. priority is greater than the importance-threshold, that component may not be disabled.

[end of off-line processes related to process 200]

In variations of the present invention, the functionality of external-command-sending unit 110 is replaced by an analyzing application module, wherein processor 54 of smart mobile device 50 is configured to execute the analyzing application module, to thereby performing the tasks of external mobile-analyzing unit 110 of mobile-diagnostic-and-repair system 100.

Figure 4:
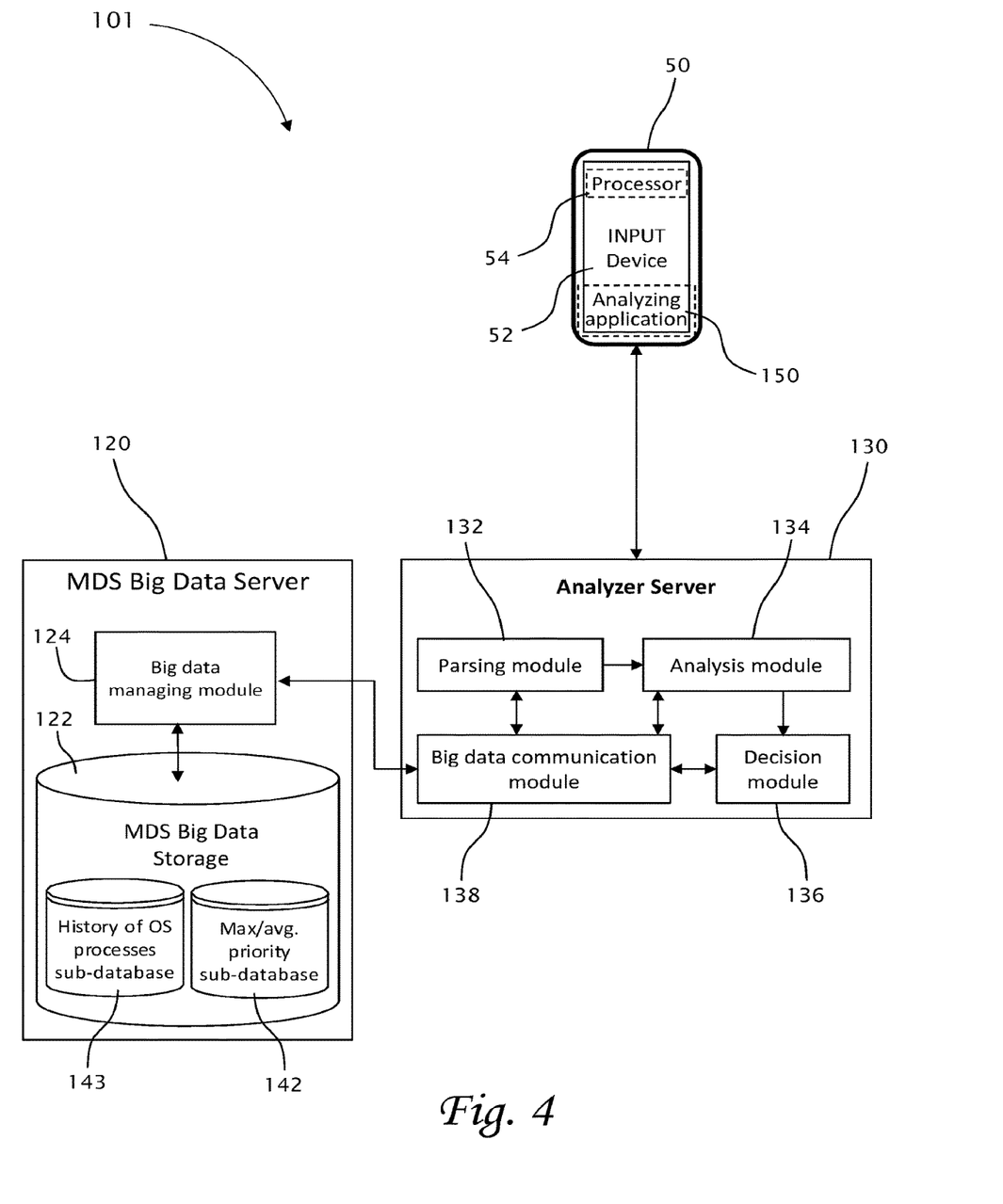
FIG. 4 is a schematic illustration of another example mobile-diagnostic-and-repair system, according to some embodiments of the present invention.

Accordingly, FIG. 4 is a schematic illustration of an example mobile-diagnostic-and-repair system 101, according to the variations of the present invention. In the example shown in FIG. 4, mobile-diagnostic-and-repair system 101 includes an analyzing application module 150, an analyzer server 130 and a selected MDS-big-data server 120 having a big-data-storage-unit 122 and optionally a big-data-managing module 124.

Analyzer server 130 may include a parsing module 132, an analysis module 134, a decision module 136, and a big-data-communication-module 138, wherein analyzer server 130 is in communication flow with MDS-big-data server 120, and wherein analyzer server 130 is adapted to access the big-data-storage-unit 122, typically, via big-data-managing module 124.

Analyzing application module 150 resides in the memory of malfunction mobile device 50, wherein processor 54 of malfunction mobile device 50 is configured to execute analyzing application module 150, to thereby performing the tasks performed by external mobile-analyzing unit 110 of mobile-diagnostic-and-repair system 100.

Analyzing application module 150 is configured to interface with the OS of mobile device 50, on the one hand, and analyzing application module 150 is configured to interface with analyzer server 130, on the other hand. Thereby, facilitated the diagnosis and repair of malfunction mobile device 50.

Analyzer server 130 may be embodied as a local server or a remote server, including a cloud server.

Figure 5:
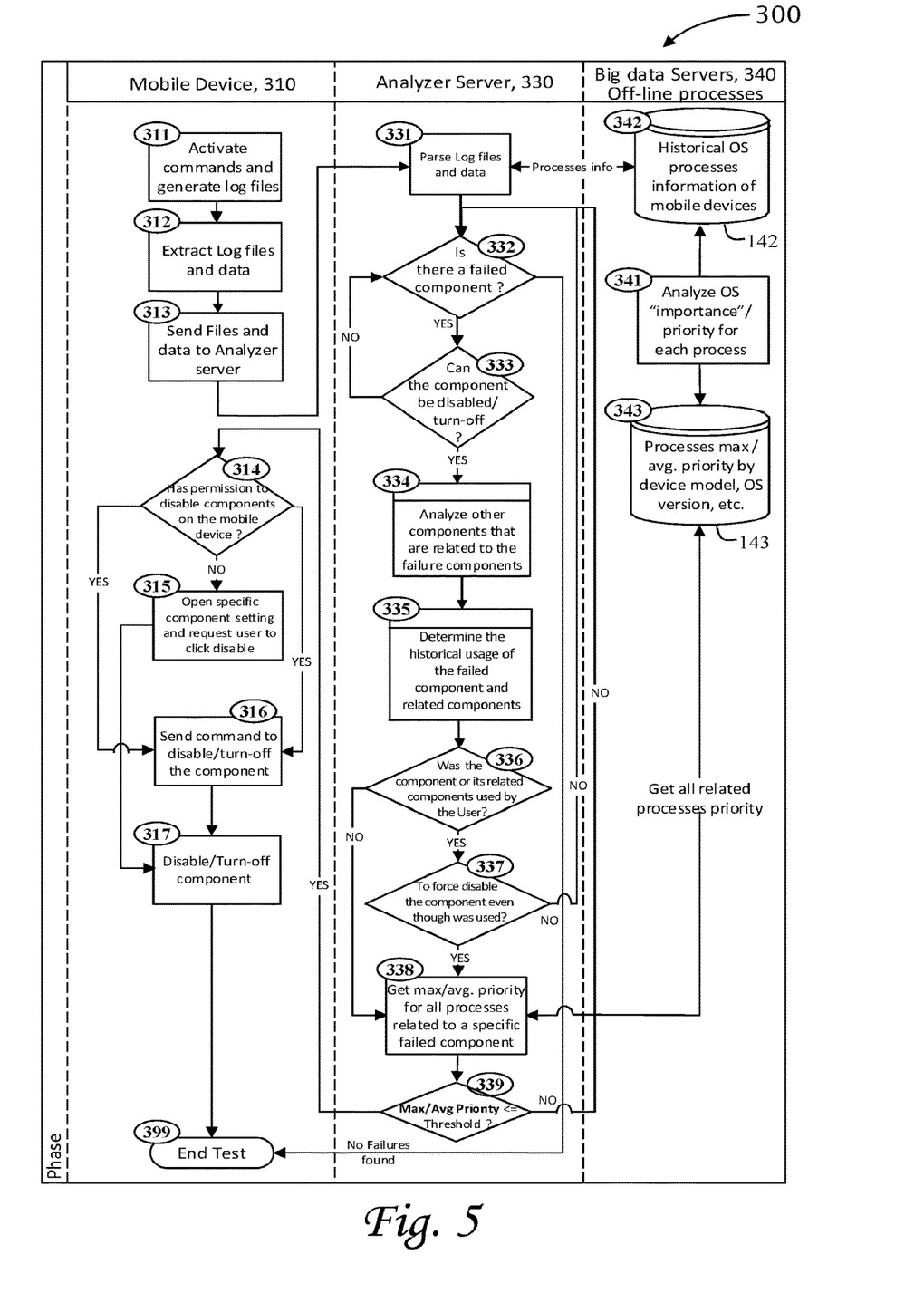
FIG. 5 is a schematic flow chart of an exemplary diagnosing-and-repairing process of diagnosing and repairing a malfunction mobile device, according to some embodiments of the present invention.

Reference is now also made to FIG. 5, showing a schematic flow chart of an exemplary diagnosing-and-repairing process 300 of diagnosing and repairing a malfunction mobile device 50, according to embodiments of the present invention. It is made clear that the provided embodiments may include only parts of this scheme. Schematic flow chart shown in FIG. 5 is schematically subdivided into vertical sections, that show processes and events for each type of components of mobile-diagnostic-and-repair system 101, including a "mobile device" section 310, an "Analyzer server" section 330 and a "Big Data servers" section 340.

Referring to the off-line process of "Big Data servers" section 340, analysis server 130 performs an importance/priority analysis (denoted as step 341 of diagnosing-and-repairing process 300) of the OS of the mobile devices of respective $3^{rd}$ party providers. Some results of the importance/priority analysis Some results of the importance/priority analysis are stored (denoted as step 343 of diagnosing-and-repairing process 300) in a sub-database 143, which resulting data includes the computed max/avg. priority for all OS processes, organize, for example and with limitations, by priority by device model, OS version, etc. Further results of the importance/priority analysis are stored (denoted as step 343 of diagnosing-and-repairing process 300) in sub-database 142, which resulting data includes the logs of historical OS processes information of mobile devices of the respective $3^{rd}$ party providers.

Diagnosing-and-repairing process 300 proceeds as follows:

Step 311: process at section 310. Activating commands and generating log files.

Analyzing application module 150 runs commands and/or applications on malfunction mobile device 50 to thereby prompting processing activity, including OS related activity. Analyzing application module 150 then logs/records activities of the malfunction mobile device 50, and thereby generating log files, tracings and recordings resulted from the activities of the activated functions/applications.

Step 312: process at section 310. Extracting log files and data.

Analyzing application module 150 extracts the logged/recorded activities of the activated functions/applications of malfunction mobile device 50, using for example, a historical sub-database 142.

Step 313: process at section 310. Sending files and data to mobile-analyzer server.

Analyzing application module 150 sends the extracted log files and data to analyzer server 130, the "data" being, for example, information about malfunction mobile device 50 and the extracted recordings resulted from the activities of the activated functions/applications.

Step 331: processes in section 330. Parsing the extracted log files and data.

Parsing module 332 of analyzer server 330 parses the extracted log files and data to thereby detect a failed component or service (hereinafter referred to as a "failed component").

Step 332: processes in section 330. Was a failed component detected?

Analyzer server 130 attends to the next component and determines if it is a failing component.

If the currently attended component is in order and is the last component to be analyzed, go to step 399 (exit diagnosing-and-repairing process 300).

If the currently attended component is in order and is not the last component to be analyzed, repeat step 332.

Step 333: processes in section 330. Can the component be disabled?

It has been determined that the currently attended component is a failing component.

To determine if the failed component can be disabled/turned off, decision module 136 of analyzer server 130 communicates, via big-data-communication-module 138, with big-data-storage-unit 122, in which unit 122 the related $3^{rd}$ party indicates if and in which conditions the failed component can be turned off.

Based on the decision made by decision module 136, analyzer server 130 determines if the failed component can be turned off. If the failed component cannot be turned off, go to step 332. That is, no repair option is available for this failed component.

Step 334: processes in section 330. Analyze other components that are related to the currently failed component.

It has been determined that the currently failed component can be turned off.

Analysis module 134 of analyzer server 130 analyzes other components that are related to the currently failed component to determine if any such related component is a failed component too.

Step 335: processes in section 330. Determine if the failed component or its related components used by the user of the malfunction mobile device?

Analyzer server 130 analyzes the usage history of the failed component or its related components, using historical sub-database 142, to thereby determine if the failed component or its related components was used by the user of the malfunction mobile device 50.

Step 336: processes in section 330. Was the failed component or its related components used by the user of the malfunction mobile device?

Analyzer server 130 determines if the failed component or its related components was used by the user of the malfunction mobile device 50, for example, by searching historical sub-database 142.

If the failed component or its related components was not used by the user of the malfunction mobile device 50, go to step 338.

Step 337: process of section 330. Check if to force disable the component even though it was used.

Analyzer server 130 determines if to force disable the component even though was used off the malfunction mobile device 50. It can be determined, for example, by how much the component was used. If the usage of using the component, or its related components, is below a specific threshold, then it can be disabled. It can also be determined if a relevant/related component was in the foreground below a predefined time interval.

If it is not allowed to force disable the failed component, even though the failed component was used off the malfunction mobile device 50, go to step 332.

Step 338: process of section 330. Get the maximum/average (max/avg.) priority for all processes related to the failed component.

Analyzer server 130 obtains the max/avg. priority for all processes related to the failed component, from max/avg. priority sub-database 143. The max/avg. priority for all processes related to the failed component quantifies the importance of a component. Decision module 136 compares the max/avg. priority to a preconfigured threshold, and thereby, decision module 136 can determine if the failing component can be neutralized without impairing the stability of the operating system.

Analyzer server 130 further analyzes other components that are related to the currently failed component to determine if any such additionally failed component has a high max/avg. priority that prevents that additionally failed component from being turned off.

Step 339: process of section 330. Check if the obtained ax/avg. priority for all processes related to the failed component surpasses a preconfigured threshold.

Decision module 136 of analyzer server 130 determines if the obtained max/avg. priority for all components related to the failed component surpasses the obtained preconfigured threshold.

If the obtained ax/avg. priority for all components related to the failed component surpasses the preconfigured threshold, go to step 332.

Else, the obtained ax/avg. priority for all components related to the failed component does not surpass the preconfigured threshold, and thereby go to step 314.

Step 314: processes in section 310. Check if permission to automatically disable components on the mobile device was granted.

It has been determined that the obtained ax/avg. priority for all components related to the failed component does not surpass the preconfigured threshold.

Analyzing application module 150 determines if permission to automatically disable the failed component and/or related components was granted. If the failed component can be disabled automatically, go to step 316.

Step 315: processes in section 310. Prompting the user to disable the currently failed component, when the permission level is not enough to do it automatically.

It has been determined that the currently failed component cannot be turned off automatically. That is, no repair option is available for this failed component.

Analyzing application module 150 prompts the user to manually disable the currently failed component, by opening the specific component's setting and requesting the user to click disable, if such option is available.

If the user has manually selected to disable the currently failed component, go to step 317

Step 316: processes in section 310. Determine if the failed component or its related components used by the user of the malfunction mobile device?

Analyzer server 130 sends a Disable/Turn-off command to the failed component and/or its related components that was/were used by the user of the malfunction mobile device 50.

Step 317: processes in section 310. The failed component or its related components is/are turned-off.

The failed component or its related components is/are turned-off.

Step 399: Exit.

[end of process 300]

It should be noted that the off-line processes related to diagnosing-and-repairing process 300, conducted in process of section 340 are similar to the off-line processes related to diagnosing-and-repairing process 200, conducted in process of section 240.

It should be noted that in some embodiments, analyzer server 130 and MDS-big-data server 120 may be embodied as a single server.

The present invention being thus described in terms of several embodiments and examples, it will be appreciated that the same may be varied in many ways. Such variations are not to be regarded as a departure from the spirit and scope of the invention, and all such modifications as would be obvious to one skilled in the art are considered.

What is claimed is:

1. A method of diagnosing and repairing a malfunction component of an operating system (OS) of a faulty mobile device, conducted after performing an off-line, pre-process analysis and computation of a max/avg. priority of each process of each component of the OS, the method comprising:
receiving, by the mobile device from an external system that is external to the faulty mobile device, at least one operational command, wherein the at least one operational command prompts processing activity in the faulty smart mobile device, including OS related activity;
recording logs of the processing activity in the faulty smart mobile device;
sending the logs to the external system, wherein the external system performs operations comprising:
extracting data related to the faulty smart mobile device from a server, the extracted data containing historical activity information and manufacturer's data related to the faulty smart mobile device;
analyzing the recorded data and the extracted data to thereby detect a malfunctioned OS component and/or a related malfunctioned component that is related to the detected malfunctioned OS component;
using the data extracted from the server, determining if the detected malfunctioned OS component and/or the related malfunctioned component may be disabled, based on the pre-computed max/avg. priority of processes related to the detected malfunctioned OS component and/or a related malfunctioned component;
upon determining that the detected malfunctioned OS component and/or the related malfunctioned components may be disabled, sending a disable command to the faulty mobile device; and
receiving the disable command; and
disabling the detected malfunctioned OS component and/or the related malfunctioned components.

2. The diagnosing-and-repairing method as in claim 1, wherein the external system comprises an external-command-sending unit, an analyzer server, and a big data server.

3. The diagnosing-and-repairing method as in claim 1, wherein the detecting of a malfunctioned OS component and/or a related malfunctioned component is performed by an analyzer server of the external system.

4. The diagnosing-and-repairing method as in claim 1 wherein the external system performs further operations comprising of analyzing an importance of each process of each component of the OS of the smart mobile device.

5. The diagnosing-and-repairing method as in claim 4, wherein the external server includes an analyzer server, and the external system performs further operations comprising of analyzing the importance of each process of each component of the OS of the faulty mobile device is performed by the analyzer server.

6. The diagnose-and-repair method as in claim 1, wherein the external system includes an MDS-big-data server that includes a big-data-storage-unit and optionally a big-data-managing module.

7. The diagnose-and-repair method as in claim 6, wherein the big-data-storage-unit comprises a max/avg priority sub-database and a history of OS processes sub-database.

8. The diagnose-and-repair method as in claim 6, wherein the external system includes an analyzer server, and the analyzer server is adapted to access the big-data-storage-unit via the big-data-managing module.

9. The diagnose-and-repair method as in claim 1, wherein the max/avg priority sub-database is built and updated off-line by an importance analysis of each process of each component of the OS of the smart mobile device.

10. The diagnose-and-repair system as in method 9, wherein the external system includes an analyzer server, and the importance analysis is performed by the analyzer server.

11. The diagnose-and-repair method as in claim 3, wherein the external system includes an analyzer server and a MDS-big-data server, and the analyzer server and the MDS-big-data server are embodied as a single server.

* * * * *